Jan. 2, 1923.
G. R. BROWN.
VALVE CAP.
FILED OCT. 22, 1921.
1,440,718.
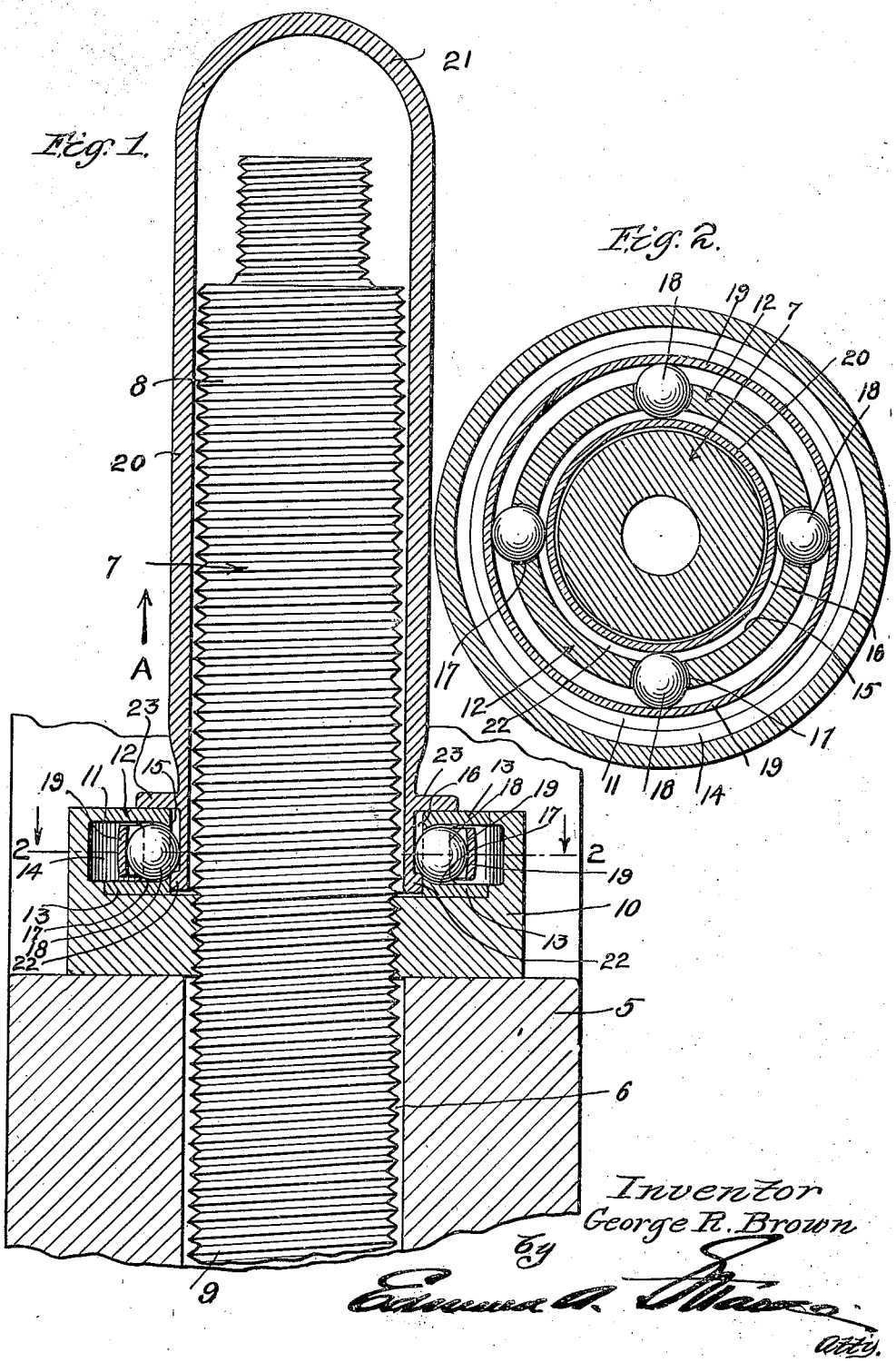
Inventor
George R. Brown Patented Jan. 2, 1923.

1,440,718

UNITED STATES PATENT OFFICE.

GEORGE R. BROWN, OF LOS ANGELES, CALIFORNIA.

VALVE CAP.

Application filed October 22, 1921. Serial No. 509,562.

*To all whom it may concern:*

Be it known that I, GEORGE R. BROWN, a citizen of the United States, residing at Los Angeles, in the county of Los Angeles and State of California, have invented new and useful Improvements in Valve Caps, of which the following is a specification.

My invention relates to valve caps for enclosing valve stems of pneumatic vehicle tires, and has for its object to provide a cap for this purpose which may be quickly and easily removed from, or securely attached to a valve stem when it is desired to fill the tire with air.

In the drawings:

Fig. 1 is an enlarged longitudinal section through my cap construction, as it would appear when applied to a valve stem.

Fig. 2 is a transverse section of the same, taken on the line 2—2 of Fig. 1.

In carrying out my invention, 5 represents the felly of a wheel, which is provided with an aperture 6 through which the valve stem 7 projects, the end 8 of which is provided with the usual valve (not shown), and the end 9 of which is connected in the usual manner with the inner tube of the tire (not shown).

Secured to the valve stem 7, and adapted to rest against the inner periphery of the wheel felly 5 is a threaded jam nut 10, having an enlarged bore 11 into which is mounted a sleeve 12 having on each of its ends an extending annular flange 13, the outer surfaces of said flanges adapted to fit tightly into the bore 11 in pressed relation therewith, thus firmly securing said nut and sleeve together and forming an annular recess or pocket 14 in the nut 10, as clearly shown in Fig. 1 of the drawings.

The bore 15 of sleeve 12 is of larger diameter than the diameter of the valve stem 8, thus forming an annular channel 16 between the sleeve 12 and said valve stem. Sleeve 12 has a plurality of apertures 17 through which balls 18 partially project into the channel 16, a spring split ring 19 mounted in the pocket 14 directly behind the balls maintaining the same in an operative position.

The dust cap 20 comprises a piece of tubing which is closed at one end as at 21, and is provided at its oppositely disposed open end with an outwardly extending annular flange 22 of such diameter as to have a sliding fit in the bore 15 of sleeve 12. A second flange 23 is formed on the cap 20 a suitable distance above the flange 22 and is of greater diameter than the bore 15 of sleeve 12 and is adapted to rest on said sleeve.

When the cap is assembled to the valve stem as shown in the drawings, it will be seen that the flange 22 on said dust cap projects under the spring pressed balls 18, which serve as latches, thus firmly locking the dust cap in position around the valve stem. When it is desired to remove the cap 20 it is only necessary to exert a pull upon it in the direction indicated by the arrow A in Fig. 1 of the drawings, of sufficient force to overcome the tension of the spring ring 19, thus causing the balls 18 to yield outwardly and allow the flange 22 to pass by them. When it is desired to replace the dust cap the flange 22 is inserted into the bore 15 and upon pressure the lower outer edge of said flange engages with the balls 18 and forces them outwardly against the pressure of the spring 19, thus allowing the flange to pass between the balls and to again become locked under them.

What I claim is:

1. The combination with the felly of a wheel and a valve stem extending therethrough, of a recessed nut threaded on to said stem, a plurality of radially disposed latches mounted in the recess formed in said nut, a dust cap provided at its end with an annular flange adapted to engage with said latches, and a spring ring mounted in the recess of said nut and adapted to press all of said latches into engagement with said flange.

2. The combination with the felly of a wheel and a valve stem extending therethrough, of a nut provided with an enlarged bore threaded on said stem, a plurality of radially disposed balls mounted in said bore, a tubular cap provided at one of its ends with a flange adapted to engage under said balls, and a flat spring ring adapted to engage with and surround said balls, whereby said balls will be yieldingly held in engagement with said flange.

3. The combination with the felly of a wheel and a valve stem extending therethrough, of a nut threaded to said valve stem provided with an enlarged bore having a sleeve secured therein, the wall of said sleeve being provided with a plurality of apertures having balls disposed therein and projecting beyond both the inner and outer surfaces of said sleeve, a spring ring adapted to surround said balls and contact therewith, and a tubular cap provided at one of its ends with a flange adapted to surround said stem and to engage with said balls, whereby said cap will become yieldingly locked to said stem and collar.

4. In combination with the felly of a wheel and a valve stem extending therethrough, of a nut threaded on to said stem, said nut provided with an annular recess in one end thereof, an annular flanged sleeve provided in its walls with a plurality of tapered apertures for the reception of balls, and a flat spring ring mounted in said sleeve and disposed between said flanges and engaging said balls to normally seat the same in the tapered apertures, said sleeve mounted tightly in the annular recess formed in the nut, and a tubular cap provided at one of its ends with a flange adapted to surround said stem and engage with said balls, whereby said cap will become yieldingly locked to said nut.

In witness that I claim the foregoing I have hereunto subscribed my name this 27th day of September, 1921.

GEORGE R. BROWN.